July 29, 1958 L. GINSBERG 2,845,494
MEANS FOR ACTIVATING AN INDICATING DEVICE
Filed Dec. 7, 1955
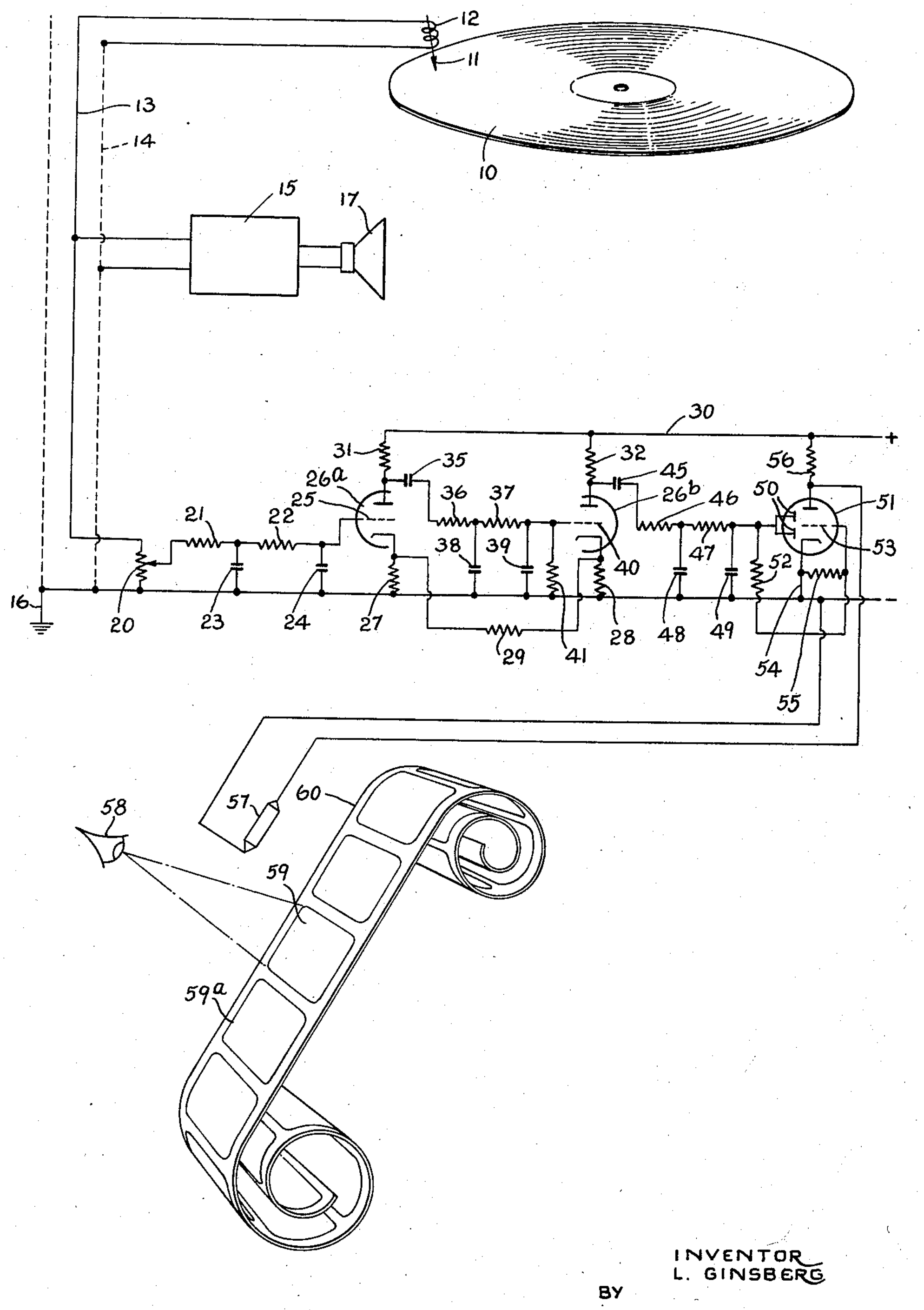
INVENTOR
L. GINSBERG
BY
Maybee & Legris
ATTORNEYS United States Patent Office 2,845,494
Patented July 29, 1958

2,845,494

MEANS FOR ACTIVATING AN INDICATING DEVICE

Leon Ginsberg, Toronto, Ontario, Canada, assignor to The Markad Company, Toronto, Ontario, Canada, a corporation Application December 7, 1955, Serial No. 551,628
4 Claims. (Cl. 179—100.1)

This invention relates to a means for selecting a band of audio-frequency signals from the spectrum of audio-frequency signals produced by a phonograph cartridge when tracking the groove of a phonograph record, and is specifically concerned with a means whereby a signal, hereinafter referred to as the monitoring signal, of a predetermined frequency can be isolated from the audio-frequency spectrum represented on the phonograph record, and employed to activate an indicating device which will instruct a person to perform a particular movement, for example, to index a strip of processed photographic film through a projector or other viewing apparatus.

The invention has particular application in the presentation of recorded aural works of art which have a visual appeal, for example, phonographic recordings of opera, ballet, certain types of program music, musical plays, and the recording of dramatic works, such as the works of Shakespeare, Ibsen, et cetera.

The means according to the invention is particularly for use in a system in which a person is provided with a viewing apparatus and a film strip, together with a phonograph record of the work to be observed. The person reproduces the phonograph record through his domestic phonograph, to the phonograph cartridge of which the means of invention is connected, and the means, when activated by a monitoring signal incorporated in the recorded frequency spectrum, gives a visual indication to the person that the film strip should be indexed through one frame to keep the pictorial representation on the film strip in synchronism with the appropriate section of the work recorded on the phonograph record.

By utilizing an existing domestic phonograph, the cost of installing the system is very considerably reduced.

An object of the invention is to provide a means of the kind set forth which is of simple construction and easy to manufacture.

Another object is to provide a means of the kind set forth which can be connected to an existing reproducing system by a person having little or no knowledge of electronics.

A further object is to provide a means of the kind set forth in which a visual indication is provided instead of a distracting aural one.

A still further object is to provide a means of the kind set forth which, when connected to an existing reproducing equipment, will not result in deterioration in the quality of sound produced by the reproducer.

Further objects and advantages of the invention will be appreciated by a study of the following specification, when taken in conjunction with the single accompanying drawing, which is a diagrammatic representation of the system, and shows the electrical circuit diagram of the means according to the invention.

In the drawing, the phonograph record is indicated at 10 and the stylus of the phonograph cartridge at 11, the generating system of the phonograph cartridge being indicated at 12, and the cartridge output leads at 13, 14. The lead 13 is connected to the signal input of an amplifier 15 of the phonograph, and the lead 14, which is indicated as being the screening of a co-axial cable, is grounded at 16. As will be readily appreciated the amplifier 15 feeds a conventional loud speaker 17.

The lead 13 is also connected to an input potentiometer 20 of the means according to the invention, the cursor of the potentiometer being connected to a low-pass filter formed by the resistors 21, 22 and capacitors 23, 24, the output of which is connected to the grid 25 of one half of a double triode tube **26*a*, 26*b***.

The cathodes of the tube **26*a*, 26*b* are respectively provided with bias resistors 27, 28, and are interconnected through a resistor 29 for a purpose hereinafter referred to. The anodes of the respective sections of the tube are connected to a source of potential by the power supply line 30, and are provided with anode load resistors 31, 32**.

The anode of the section **26*a* is connected via a condenser 35 to a second low-pass filter formed by resistors 36, 37 and condensers 38, 39, the output of the filter being connected to the grid 40 of the section 26*b*. The grid 40 is provided with a grid leak resistor 41**.

Connected to the anode of the section **26*b* is a condenser 45, the condenser being of low value and acting as a high-pass filter, and the condenser 45 is connected to a third low-pass filter formed by resistors 46, 47 and condensers 48, 49, the output of the low-pass filter being connected to the diode anodes 50 of a double diode triode tube 51, the anodes 50 being in turn connected through a resistor 52 to the grid 53 of the triode section of the tube. The cathode of the tube is grounded by the line 54, and a grid leak resistor 55 is provided, the triode anode of the tube being connected to the power supply line 30 by a resistor 56**.

Connected in parallel with the tube 51 is a neon lamp 57 which is placed at a position in which it will attract the attention of a person, whose eye is indicated at 58, viewing an image 59 on a strip of processed photographic material 60.

Obviously, instead of the image 59 being directly viewed it can be projected onto a screen or magnified in any convenient manner.

The operation of the system above described is as follows:

The phonograph record 10 is manufactured to have a frequency spectrum which extends from 40 cycles per second and may extend up to, for example, 16 kilocycles per second. Below the cut-off at 40 cycles, for example at 30 cycles per second, a monitoring signal is applied to the record at predetermined intervals of time at which the person viewing the image 59 is to pass onto the next image **59*a***.

The stylus 11 as it traces the groove of the record causes the generating system of the cartridge to produce a signal including the recorded frequency spectrum and the monitoring signal, the signal being passed by the line 13 to the input of the amplifier of the reproducing equipment and to the potentiometer 20. In the phonographic reproducing equipment the said frequency spectrum recorded is reproduced, but the monitoring signal is not, this being due to the inherent limitations in the majority of commercial phonographs which cut off in the region of 40–60 cycles per second. If the record is to be used with a wide range phonographic reproducer having, for example, a frequency range of from 16–20 cycles to above the limits of audibility, a high-pass filter would be placed somewhere in the amplifying chain of the phonograph to eliminate the monitoring signal.

Alternatively, the phonograph record could be manufactured having a frequency range which covered the whole of the audible spectrum, i. e., from 16–20 cycles per second to above the limits of audibility, and the recording curve in this case would be provided with a sharp trough in the vicinity of the frequency of the monitoring signal, in which trough the monitoring signal would be placed. When reproducing the record through a wide range phonograph, a sharp trough filter would be provided in the amplifying chain to remove the monitoring signal.

The signal from the generating mechanism 12 of the phonograph cartridge is fed along the line 13 to the input potentiometer 20, and from there it is fed through the low-pass filter 21—24, which rejects the whole of the recorded audio-frequency spectrum above, for example, 35 cycles per second, but accepts the monitoring signal and passes it to the grid 25 of the section *26a* of the tube. The signal applied to the grid is amplified in section *26a* and appears at the anode of the tube, after which it is passed through the condenser 35 and the second low-pass filter 36—39, the second low-pass filter again rejecting the audio-frequency spectrum above 35 cycles per second but accepting the monitoring signal, and thus attenuating any frequencies which may have broken through the first low-pass filter, after which the monitoring signal is passed to the grid 40 of the section of the tube *26b*.

The cathodes of the tube *26a*, *26b* are interconnected through the resistor 29, which provides regenerative feedback across the sections *26b*, *26a*, to increase the amplification factor at the frequency of the monitoring signal, in a manner which is well known.

The signal appearing at the anode of the section *26b* is passed through the condenser 45, which has a value such that in conjunction with the following low-pass filter it will attenuate all frequencies below the frequency of the monitoring signal. This is necessary because the majority of commercial phonograph records and playing equipments produce low frequency noises of an order of 10–20 cycles per second, commonly known as rumble, and it is necessary to eliminate these to prevent the signal corresponding to them from operating the visual indicator.

After the signal has passed through the condenser 45 it is applied to the third low-pass filter 46—49 and then to the diode anodes 50 of the tube 51. In this way, the A.-C. monitoring signal is converted into fluctuating D.-C., which is employed as the bias voltage on the grid 53 by passing it through the resistor 52.

The triode portion of the tube 51 is normally biased by the grid leak resistor 55 to a condition in which it is rendered conductive, the monitoring signal, when rectified by the diode anodes 50 and applied to the grid 53, biasing the tube to a condition in which it is non-conductive.

Connected in parallel with the tube is the neon lamp 57 which, when the tube is conducting, remains inactive due to the voltage drop across the resistor 56. When however the triode portion is rendered non-conductive, there is no drop across the resistor 56 and the anode voltage builds up to the line voltage, the supply voltage being sufficient to activate the neon lamp.

Thus, it will be seen that, when a monitoring signal appears on the phonograph record, that signal will be converted into a visual indication at the neon lamp 57 and the person using the system will be informed that the strip of photographic material should be indexed through one frame.

It has been found in practice that the following component values work satisfactorily in conjunction with the following tubes:

| | |
|---|---|
| Tube ***26a***, ***26b*** | Type 12AX7. |
| Tube **51** | Type 6AT6. |
| Neon lamp | Type NE2. |
| Resistors **21**, **22**, **36**, **37**, **41**, **46**, **47**, **52**, **55** | 1 megohm, ¼ watt. |
| Resistors **31**, **32**, **56** | 470 kilohms, 1 watt. |
| Resistors **27**, **28**, **29** | 2 kilohms, ½ watt. |

| | |
|---|---|
| Potentiometer **20** | 2 megohms, linear, 1 watt. |
| Capacitors **23**, **24**, **38**, **39**, **48**, **49** | .005 microfarad. |
| Capacitor **35** | .05 microfarad. |
| Capacitor **45** | .01 microfarad. |

By providing a visual as compared to an audible indicator, a person using the system is not subjected to distracting noises in the form of "clicks" or "pops." Also, the phonograph record can be reproduced on any suitable phonograph without the need of modifying the amplifying system of the phonograph, the connection of the means of the invention to the amplifying system being a simple mechanical operation which can easily be performed by an unskilled person.

By forming the means of the invention to have an input circuit which does not include inductances, interference with the amplifying system of the phonograph is reduced to a minimum, and, by arranging for the monitoring signal to lie in the lower audio range the effects of incorrect turntable speed or "wow" on the means is reduced to a minimum, and will be tolerated by the means to an extent which would not be found tolerable by a person listening to the reproduction.

Once the means is installed it can remain connected to the phonograph irrespective of whether a standard recording or the recording including a monitoring signal be played on the phonograph. The indicator, during the reproduction of a standard recording, will flash in response to every signal at the frequency of the monitoring signal, but, as the indicator is noiseless, this is of no consequence.

It will be seen that by the use of the means of the invention, a system of the kind described can be set up at very low cost without in any way affecting the versatility of the phonograph used in the system.

For viewing the film strip, any convenient apparatus may be used, for example, an existing film-strip projector or viewer can be used, or a film-strip projector or viewer can be supplied with the film and phonograph record, in which case the means of the invention could be built into the projector or viewer as an integral unit, the neon lamp being displayed in some prominent position on the apparatus.

What I claim as my invention is:

1. The combination including a sound record with an audio-frequency spectrum and an intermittent signal of a frequency below the audio-frequency spectrum recorded thereon, means for translating the audio-frequency spectrum and intermittent signal into electrical impulses, an amplifier and an electro-acoustic transducer for the impulses representing the audio-frequency spectrum, a low-pass filter passing the impulses representing the intermittent signal and rejecting the impulses representing the audio-frequency spectrum, an amplifier for the impulses appearing at an output of the low-pass filter, and means for converting the impulses appearing at an output of the amplifier of the low-pass filter into a visual indication of the presence of the intermittent signal, characterized in that the means for converting the impulses into a visual indication includes a rectifier connected to an output of the amplifier of the low-pass filter, an electronic tube having a cathode, an anode, and a control grid, a connection between an output of the rectifier and the control grid, a resistance connected in series with the electronic tube, and a gaseous discharge tube connected in parallel with the electronic tube.

2. The combination including a sound record with an audio-frequency spectrum and an intermittent signal of a frequency below the audio-frequency spectrum recorded thereon, means for translating the audio-frequency spectrum and intermittent signal into electrical impulses, an amplifier and an electro-acoustic transducer for the impulses representing the audio-frequency spectrum, a low-pass filter passing the impulses representing the intermittent signal and rejecting the impulses representing the audio-frequency spectrum, an amplifier for the impulses appearing at an output of the lowpass filter, and means for converting the impulses appearing at an output of the amplifier of the low-pass filter into a visual indication of the presence of the intermittent signal, characterized in that the means for converting the impulses into a visual indication includes a second low-pass filter connected to an output of the amplifier of the first-mentioned low-pass filter, an electronic tube having a cathode, an anode, and a control grid, a rectifier connected to an output of the second low-pass filter and having an output, a connection between the output of the rectifier and the control grid, a resistance connected in series with the electronic tube, and a gaseous tube connected in parallel with the electronic tube.

3. The combination including a sound record with an audio-frequency spectrum and an intermittent signal of a frequency below the audio-frequency spectrum recorded thereon, means for translating the audio-frequency spectrum and intermittent signal into electrical impulses, an amplifier and an electro-acoustic transducer for the impulses representing the audio-frequency spectrum, a low-pass filter passing the impulses representing the intermittent signal and rejecting the impulses representing the audio-frequency spectrum, an amplifier for the impulses appearing at an output of the low-pass filter, and means for converting the impulses appearing at an output of the amplifier of the low-pass filter into a visual indication of the presence of the intermittent signal, in which the means for converting the impulses into a visual indication includes an electronic tube having a cathode, a diode anode, a triode anode, and a triode control grid, a connection between the output of the amplifier of the low-pass filter and the diode anode, a connection between the diode anode and the triode grid, a resistance connected between the cathode and the triode grid, a resistance connected at one of its ends to the triode anode and for connection at its other end to a source of potential, a gaseous discharge tube having two electrodes, a connection between one of the electrodes and the cathode, and a connection between the other of the electrodes and the triode anode.

4. The combination including a sound record with an audio-frequency spectrum and an intermittent signal of a frequency below the audio-frequency spectrum recorded thereon, means for translating the audio-frequency spectrum and intermittent signal into electrical impulses, an amplifier and an electro-acoustic transducer for the impulses representing the audio-frequency spectrum, a low-pass filter passing the impulses representing the intermittent signal and rejecting the impulses representing the audio-frequency spectrum, an amplifier for the impulses appearing at an output of the low-pass filter, and means for converting the impulses appearing at an output of the amplifier of the low-pass filter into a visual indication of the presence of the intermittent signal, in which the means for converting the impulses into a visual indication includes an electronic tube having a cathode, a diode anode, a triode anode and a triode control grid, a second low-pass filter, a connection between the output of the amplifier of the first mentioned low-pass filter and an input of the second low-pass filter, a connection between an output of the second low-pass filter and the diode anode, a connection between the diode anode and the triode grid, a resistance connection at one of its ends to the triode anode and for connection at its other end to a source of potential, a gaseous discharge tube having two electrodes, a connection between one of the electrodes and the cathode, and a connection between the other of the electrodes and the triode anode.

References Cited in the file of this patent

UNITED STATES PATENTS 2,529,097 Mullin ---------------- Nov. 7, 1950